(12) United States Patent
Xue et al.

(10) Patent No.: US 11,601,978 B2
(45) Date of Patent: Mar. 7, 2023

(54) ACCESSING A SHARED COMMUNICATION CHANNEL USING A COMMON CLOCK-TRIGGERED (CCT) LISTEN BEFORE TALK (LBT) PROCEDURE

(71) Applicant: QUALCOMM Incorporated, San Diego, CA (US)

(72) Inventors: Yisheng Xue, San Diego, CA (US); Aleksandar Damnjanovic, Del Mar, CA (US); Xiaoxia Zhang, San Diego, CA (US); Yongbin Wei, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 209 days.

(21) Appl. No.: 17/175,355

(22) Filed: Feb. 12, 2021

(65) Prior Publication Data

US 2021/0274553 A1 Sep. 2, 2021

Related U.S. Application Data

(60) Provisional application No. 62/983,422, filed on Feb. 28, 2020.

(51) Int. Cl.
*H04W 74/08* (2009.01)
*H04W 74/00* (2009.01)
*H04W 56/00* (2009.01)

(52) U.S. Cl.
CPC ..... *H04W 74/0825* (2013.01); *H04W 56/001* (2013.01); *H04W 56/0015* (2013.01); *H04W 74/006* (2013.01); *H04W 74/0816* (2013.01); *H04W 74/0891* (2013.01)

(58) Field of Classification Search
None
See application file for complete search history.

(56) References Cited

U.S. PATENT DOCUMENTS

2021/0100030 A1* 4/2021 Myung ............ H04W 74/0833
2022/0167407 A1* 5/2022 Oviedo ............ H04W 74/0808

* cited by examiner

*Primary Examiner* — Jutai Kao
(74) *Attorney, Agent, or Firm* — Norton Rose Fullbright US LLP

(57) ABSTRACT

A method of wireless communication includes identifying, by a first node configured for operation in a synchronous communication mode, a current synchronization boundary according to a common clock of the synchronous communication mode. The method further includes performing, by the first node, a common clock-triggered (CCT) listen before talk (LBT) procedure of a shared communication channel during a periodic quiet interval at the current synchronization boundary. The method further includes establishing, by the first node, in response to success of the CCT LBT procedure, a channel occupancy time (COT) configured to end at a subsequent synchronization boundary and transmitting, by the first node, data on the shared communication channel during the COT.

30 Claims, 12 Drawing Sheets

ACCESSING A SHARED COMMUNICATION CHANNEL USING A COMMON CLOCK-TRIGGERED (CCT) LISTEN BEFORE TALK (LBT) PROCEDURE

CROSS-REFERENCE TO RELATED APPLICATIONS

This application claims the benefit of U.S. Prov. Pat. App. No. 62/983,422, entitled "COMMON CLOCK AWARE CHANNEL ACCESS FOR 6 GHZ UNLICENSED BAND" and filed on Feb. 28, 2020, which is expressly incorporated by reference herein in its entirety.

BACKGROUND

Field

Aspects of the present disclosure relate generally to wireless communication systems, and more particularly, to wireless communication systems that use a common clock.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the $3^{rd}$ Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes identifying, by a first node configured for operation in a synchronous communication mode, a current synchronization boundary according to a common clock of the synchronous communication mode, performing, by the first node, a common clock-triggered (CCT) listen before talk (LBT) procedure of a shared communication channel during a periodic quiet interval at the current synchronization boundary, establishing, by the first node, in response to success of the CCT LBT procedure, a channel occupancy time (COT) configured to end at a subsequent synchronization boundary, and transmitting, by the first node, data on the shared communication channel during the COT.

In an additional aspect of the disclosure, an apparatus configured for wireless communication includes means for identifying, by a first node configured for operation in a synchronous communication mode, a current synchronization boundary according to a common clock of the synchronous communication mode, means for performing, by the first node, a CCT LBT procedure of a shared communication channel during a periodic quiet interval at the current synchronization boundary, means for establishing, by the first node, in response to success of the CCT LBT procedure, a COT configured to end at a subsequent synchronization boundary, and means for transmitting, by the first node, data on the shared communication channel during the COT.

In an additional aspect of the disclosure, a non-transitory computer-readable medium having program code recorded thereon. The program code further includes code to identify, by a first node configured for operation in a synchronous communication mode, a current synchronization boundary according to a common clock of the synchronous communication mode, code to perform, by the first node, a CCT LBT procedure of a shared communication channel during a periodic quiet interval at the current synchronization boundary, code to establish, by the first node, in response to success of the CCT LBT procedure, a COT configured to end at a subsequent synchronization boundary, and code to transmit, by the first node, data on the shared communication channel during the COT.

In an additional aspect of the disclosure, an apparatus configured for wireless communication is disclosed. The apparatus includes at least one processor, and a memory coupled to the processor. The processor is configured to identify, by a first node configured for operation in a synchronous communication mode, a current synchronization boundary according to a common clock of the synchronous communication mode, to perform, by the first node, a CCT LBT procedure of a shared communication channel during a periodic quiet interval at the current synchronization boundary, to establish, by the first node, in response to success of the CCT LBT procedure, a COT configured to end at a subsequent synchronization boundary, and to transmit, by the first node, data on the shared communication channel during the COT.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
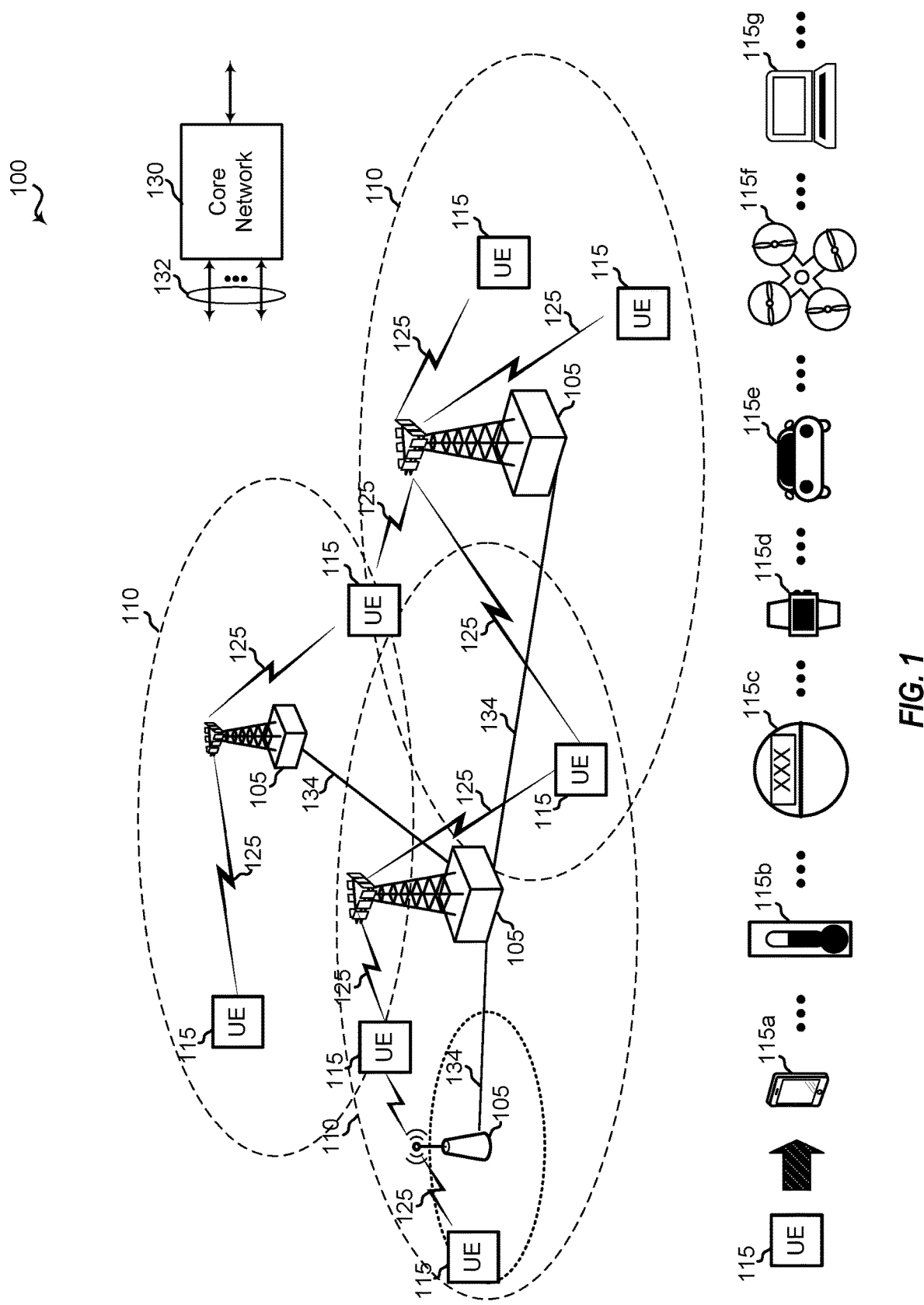
FIG. 1 is a block diagram illustrating an example of a wireless communication system according to some aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various examples, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports a new set of channel access rules that may exploit the presence of periodic quiet intervals using common clock-dependent LBT so that either nodes from the same operator may synchronize channel access or nodes of different radio access technologies (RATs) can leverage intelligence functionality (such as machine learning or artificial intelligence) to leverage intra-RAT interference management. In accordance with aspects of the present disclosure, a node configured for operation in a synchronous communication mode identifies a current synchronization boundary and performs a common clock-triggered (CCT) LBT procedure of a shared communication network, such as wireless communications system 100, during a periodic quiet interval at the current synchronization boundary (not shown). In response to a successful CCT LBT procedure, the node establishes a channel occupancy time (COT) configured to end at a subsequent synchronization boundary. The node may then transmit data on the shared spectrum on the shared communication channel during the established COT. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115*a*), a personal digital assistant (PDA), a wearable device (UE 115*d*), a tablet computer, a laptop computer (UE 115*g*), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115*e* and UE 115*o*, meters (UE 115*b* and UE 115*c*), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (Cat-1 LBT), no LBT or CCA is applied to detect occupancy of the shared channel. A second category (Cat-2 LBT), which may also be referred to as an abbreviated LBT, a single-shot LBT, or a 25-μs LBT, provides for the node to perform a CCA to detect energy above a predetermined threshold or detect a message or preamble occupying the shared channel. The Cat-2 LBT performs the CCA without using a random back-off operation, which results in its abbreviated length, relative to the next categories.

A third category (Cat-3 LBT) performs CCA to detect energy or messages on a shared channel, but also uses a random back-off and fixed contention window. Therefore, when the node initiates the Cat-3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (Cat-4 LBT), which may also be referred to as a full LBT procedure, performs the CCA with energy or message detection using a random back-off and variable contention window size. The sequence of CCA detection proceeds similarly to the process of the Cat-3 LBT, except that the contention window size is variable for the Cat-4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
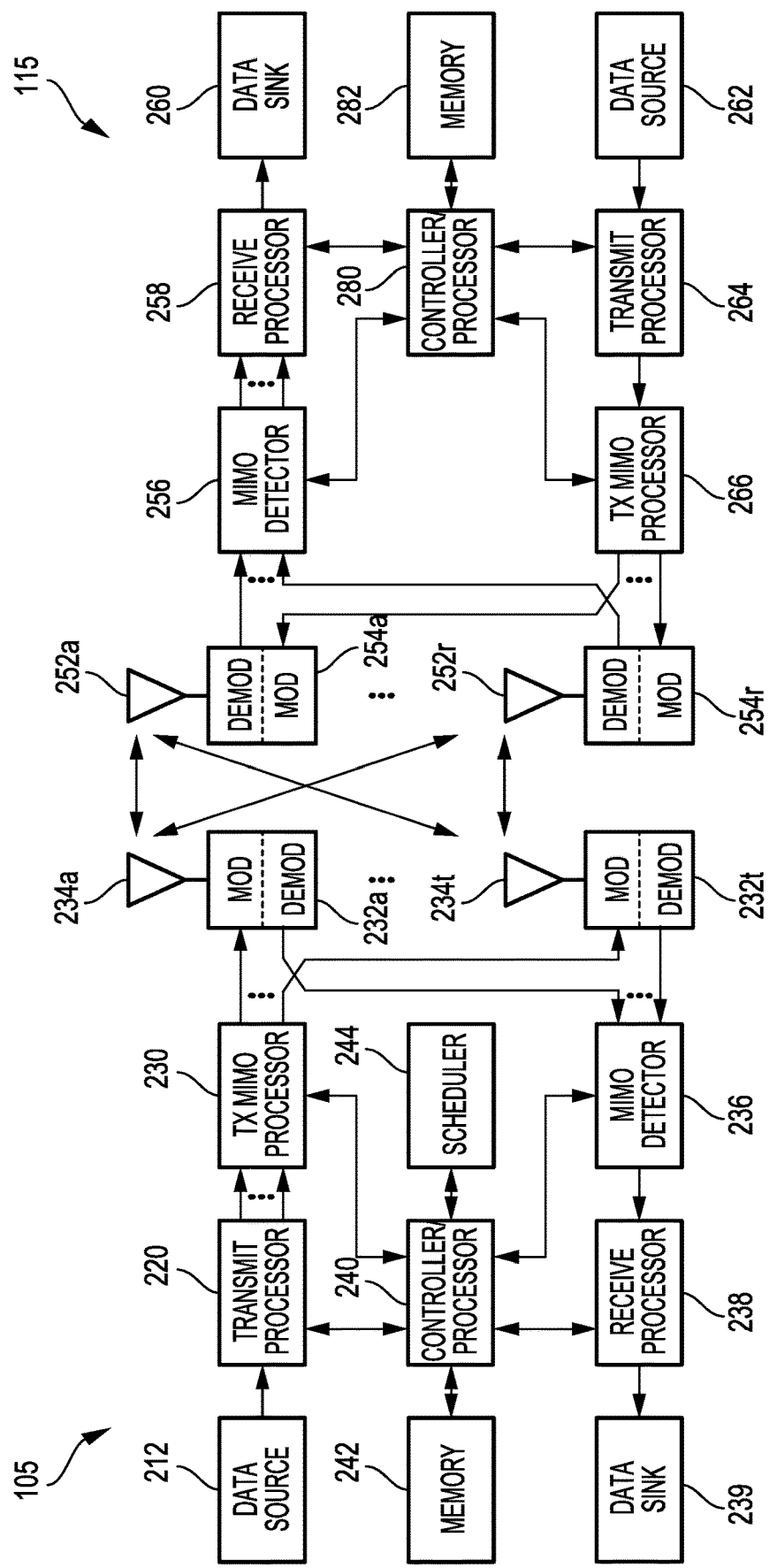
FIG. 2 is a block diagram illustrating examples of a base station and a UE configured according to some aspects of the disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the base station 105 and the UE 115, respectively. A scheduler 244 may schedule UEs for data transmission on the downlink and/or uplink.

The Federal Communications Commission (FCC) and European Telecommunications Standards Institute (ETSI) have begun to consider channel access rules for the unlicensed 6 GHz band. Opening the 6 GHz band to broader unlicensed access may open hundreds of MHz of spectrum for unlicensed usage in coming years. Communications technology companies have proposed to specify new channel access rules, on top of what are currently specific for the 5 GHz unlicensed band, that can exploit the advance in wireless communication technologies experienced in recent years, such as the advanced spatial domain transmission/reception techniques, including multiple input, multiple output (MIMO) technologies, and potentially leveraging the penetration of machine learning (ML)/artificial intelligence (AI) technologies that may affect various aspects of technology over the coming years. Such combinations of new spectrum and technologies may provide for carrying new services beyond enhanced mobile broadband (eMBB), which has been identified for usage of the 5 GHz band. The 5 GHz channel access rules were developed more than a decade ago, for radios with comparatively poor capability to handle interference, compared to current technologies. One proposal for unlicensed 6 GHz band access includes the concept of a common clock-aware channel access so that synchronization among different nodes can be arranged for better realization of quality of service (QoS). Various aspects of the present disclosure provide different channel access protocol designs developed upon the concept of common clock aware channel access.

Figure 3:
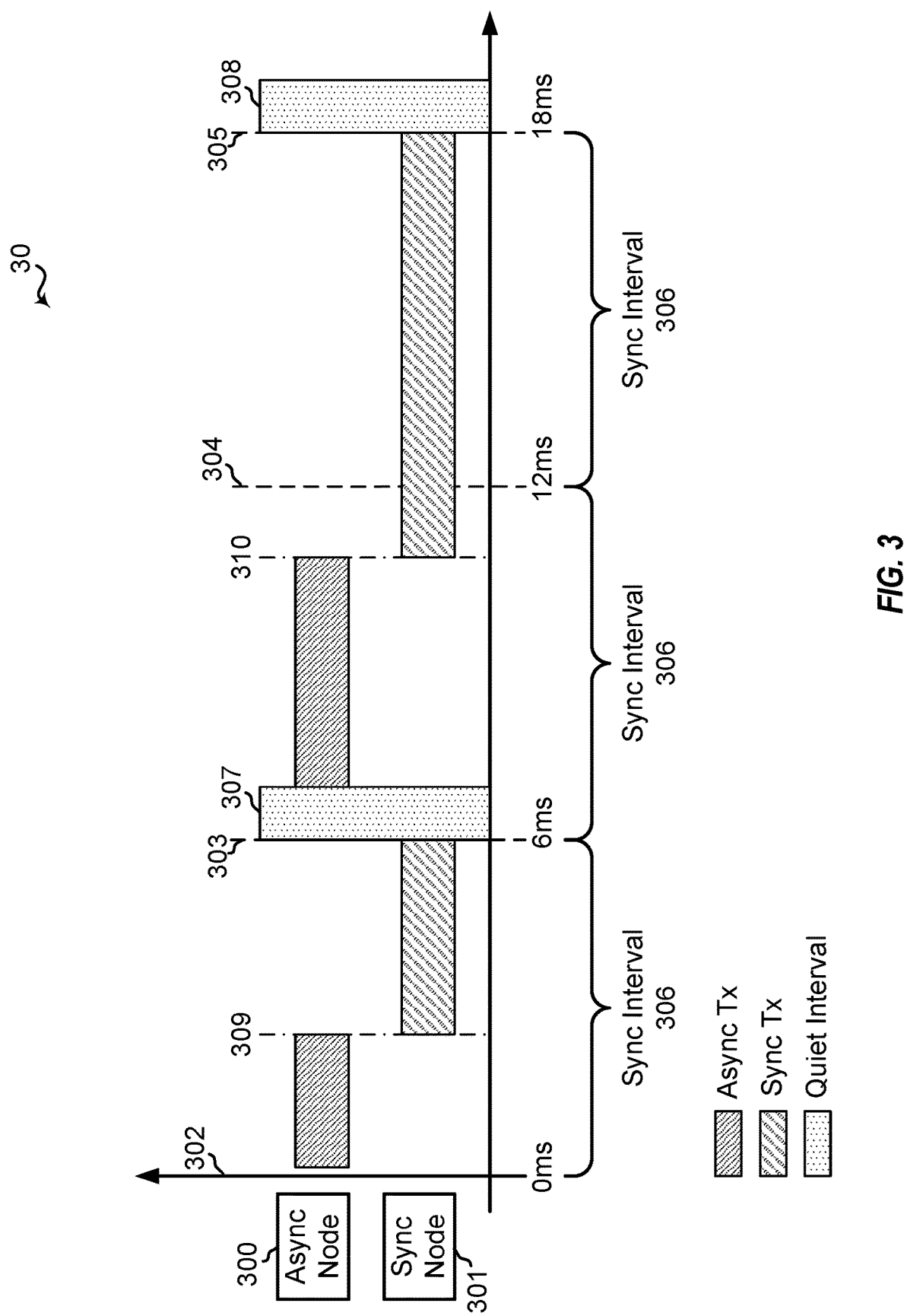
FIG. 3 is a block diagram illustrating a portion of a shared communication spectrum including a node using an asynchronous communication mode, and a node using a synchronous communication mode, each coexisting in access to shared communication spectrum according to some aspects of the disclosure.

FIG. 3 is a block diagram illustrating a portion of shared communication spectrum 30 including a node using an asynchronous communication mode, node 300, and a node using a synchronous communication mode, node 301, each coexisting in access to shared communication spectrum 30. With access to the common clock, shared communication spectrum 30 and node 301 support the synchronous communications mode access. The synchronous communications mode is defined to operate with multiple synchronization boundaries 302-304 separated by regular intervals, such as synchronization interval 306, illustrated at 6 ms intervals.

One proposal for channel access to the unlicensed 6 GHz band includes a common clock-aware channel access protocol supported with intensive performance evaluations. Such a synchronous access proposal could reduce access delay over existing asynchronous channel access schemes. Such a synchronous access mode proposal can also co-exist well with asynchronous channel access schemes in typical deployment scenarios. It is of low implementation complexity since the common clock would be checked at the instant when a Cat-4 LBT succeeds. Such a synchronous channel access scheme can be achieved even coexisting with operators running asynchronous channel access. Opportunistic quiet intervals exist over the common clock. Quiet intervals 307 and 308 are located at synchronization boundaries 303 and 305, respectively. During any of these quiet intervals 307 and 308, a node, such as nodes 300 and 301 performing a Cat-4 LBT can have its counter value decreased to avoid being starved by nearby "cooperative" hidden nodes.

In operation of such synchronous communications mode, node 300, operating in the asynchronous communications mode, obtains access to share communication spectrum 30 after successfully completing a Cat-4 LBT procedure. When its transmission ends at 309, node 301, operating in the synchronous communication mode may opportunistically obtain access to shared communication spectrum 30 and establish a COT ending at synchronization boundary 303. During quiet interval 307, nodes 300 and 301 attempt access to shared communication spectrum 30, with node 300 securing access for asynchronous mode transmission. The asynchronous mode transmission of node 300 ends at 310 before synchronization boundary 304. Node 301 again obtains access to shared communication spectrum 30 at 310 and, within the configuration of the illustrated synchronous communications mode may establish a COT that extends beyond the next synchronization boundary 304 to the end of synchronization boundary 305. As noted earlier, the configuration of the synchronous communications mode may allow nodes operating under the synchronous mode, such as node 301, to extend COT up to two-times the synchronization interval, or up to 12 ms as illustrated in FIG. 3.

In order to exploit the presence of the periodic quiet intervals, such as quiet intervals 307 and 308, various aspects of the present disclosure provide for new channel access rules using common clock-dependent LBT procedures that allow nodes from same operator to synchronize channel access. The synchronized channel access may then allow such nodes to use coordinated multipoint (COMP)-based advanced MIMO technologies. Similarly, the synchronized channel access may enable nodes of different radio access technologies (RATs) to leverage higher-intelligence technologies, such as machine learning and artificial intelligence to be clustered in the time domain (TDM) and leverage intra-RAT interference management capabilities. For example, WiFi systems may use the network allocation vector (NAV) and other advanced interference management features in IEEE 802.11ax/11be. Similarly, NR systems may operate in "frequency re-use one" mode together with the additional, advanced QoS features provided in NR operations.

Figure 4:
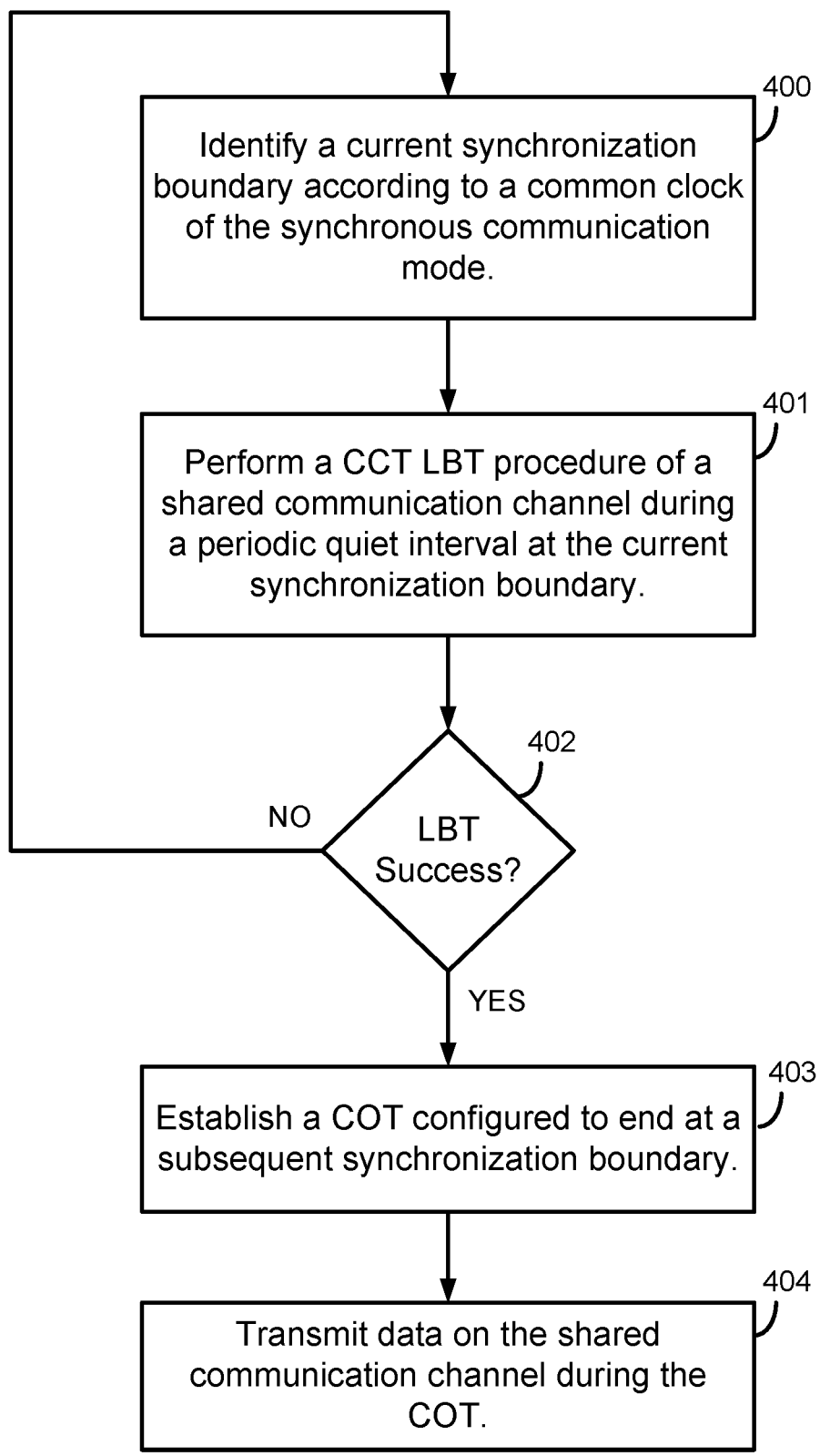
FIG. 4 is a block diagram illustrating example blocks according to some aspects of the disclosure.
Figure 11:
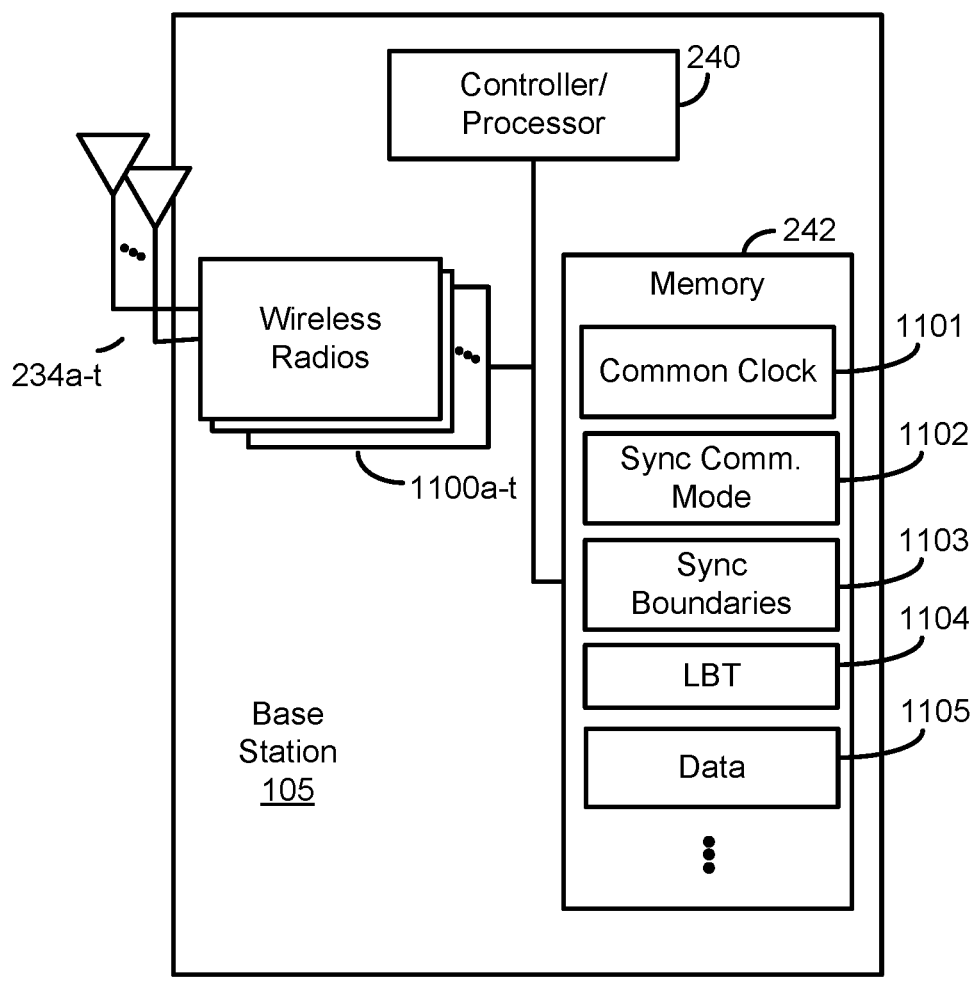
FIG. 11 is a block diagram illustrating an example base station according to some aspects of the disclosure.

FIG. 4 is a block diagram illustrating example blocks executed to implement one aspect of the present disclosure. The example blocks will also be described with respect to base station 105 as illustrated in FIGS. 2 and 11. FIG. 11 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1100*a-t* and antennas 234*a-t*. Wireless radios 1100*a-t* include various components and hardware, as illustrated in FIG. 2 for base station 105, including modulator/demodulators 232*a-t*, MIMO detector 236, receive processor 238, transmit processor 220, and TX MIMO processor 230.

Figure 12:
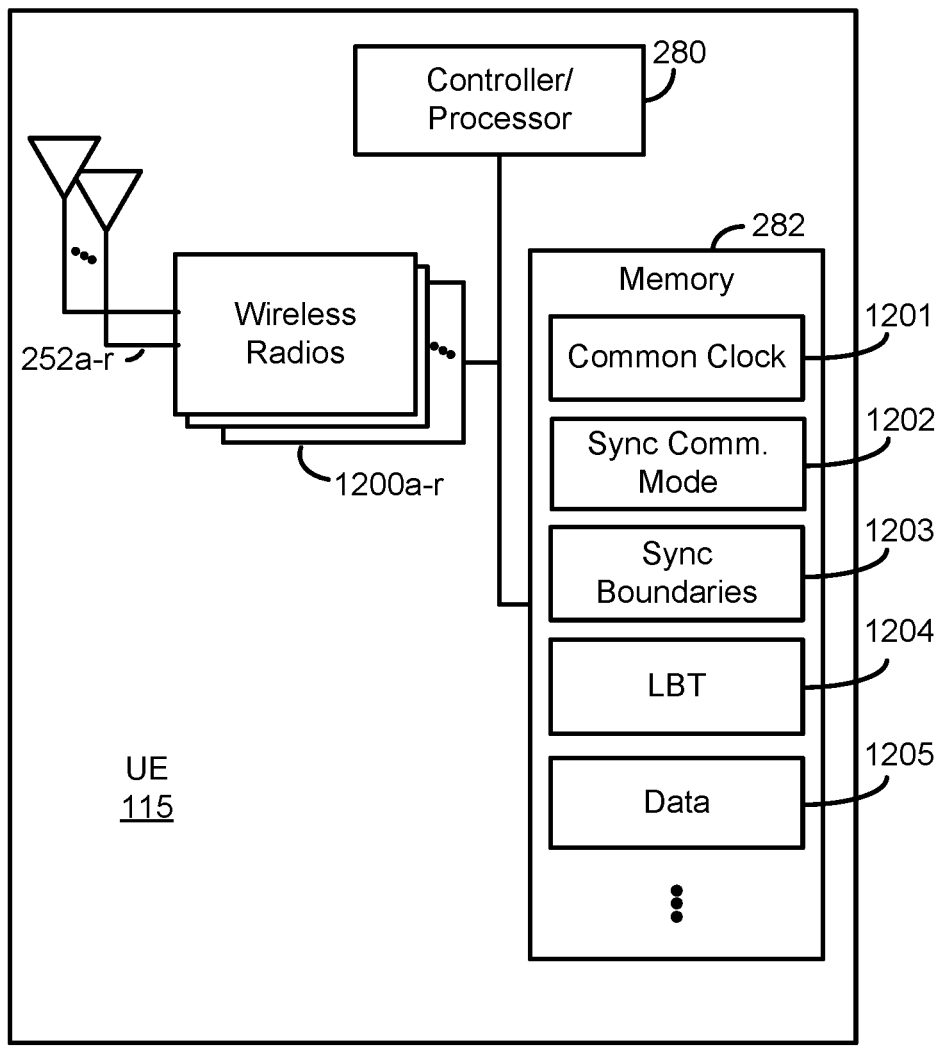
FIG. 12 is a block diagram illustrating an example UE according to some aspects of the disclosure.

The example blocks will also be described with respect to UE 115 as illustrated in FIGS. 2 and 12. FIG. 12 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1200*a-r* and antennas 252*a-r*. Wireless radios 1200*a-r* include various components and hardware, as illustrated in FIG. 2 for UE 115, including modulator/demodulators 254a-r, MIMO detector 256, receive processor 258, transmit processor 264, and TX MIMO processor 266.

At block 400, a first node identifies a current synchronization boundary according to a common clock of the synchronous communication mode. When the first node is implemented as a base station, such as base station 105, base station 105, under control of controller/processor 240, executes synchronous communication mode 1102, stored in memory 242. The actions and processes performed when controller/processor 240 executes the instructions of synchronous communication mode 1102 (referred to as the "execution environment" of synchronous communication mode 1102), provides base station 105 with the functionality for the synchronous communication mode. Within the execution environment of synchronous communication mode 1102, base station 105 accesses common clock 1101 and can recognize where each synchronization boundary by checking synchronization boundaries 1103 based on the time indicated by common clock 1101.

When the first node is implemented as a UE, such as UE 115, UE 115, under control of controller/processor 280, executes synchronous communication mode 1202, stored in memory 282. The execution environment of synchronous communication mode 1202 provides base station 105 with the functionality for the synchronous communication mode. Within the execution environment of synchronous communication mode 1202, UE 115 accesses common clock 1201 and can recognize a synchronization boundary by checking synchronization boundaries 1203 based on the time indicated by common clock 1201.

At block 401, the first node performs a common clock-triggered (CCT) LBT procedure of a shared communication channel during a periodic quiet interval at the current synchronization boundary. When the first node is implemented as base station 105, base station 105, under control of controller/processor 240, executes LBT logic 1104, stored in memory 242. The execution environment of LBT logic 1104 provides base station 105 with the functionality for performing various types of LBT procedures, including the CCT LBT procedure. Accordingly, within the execution environment of LBT logic 1104, base station 105 performs a CCT LBT procedure on the shared communication channel during the quiet period identified after the synchronization boundary.

When the first node is implemented as UE 115, UE 115, under control of controller/processor 280, executes LBT logic 1204, stored in memory 282. The execution environment of LBT logic 1204 provides UE 115 with the functionality for performing various types of LBT procedures, including the CCT LBT procedure. Accordingly, within the execution environment of LBT logic 1204, UE 115 performs a CCT LBT procedure on the shared communication channel during the quiet period identified after the synchronization boundary.

At block 402, a determination is made whether the CCT LBT procedure is successful. If the CCT LBT procedure is not successful, then the first node may return to monitor for the next synchronization boundary at block 400. When the first node is implemented as base station 105, base station 105 detects success or failure of the CCT LBT procedure within the execution environment of LBT logic 1104.

When the first node is implemented as UE 115, UE 115 detects success or failure of the CCT LBT procedure within the execution environment of LBT logic 1204.

At block 403, in response to determination of a successful CCT LBT procedure at block 402, the first node establishes a COT configured to end at a subsequent synchronization boundary. When the first node is implemented as base station 105, base station 105, within the execution environment of synchronous communication mode 1102, establishes a COT that will end at the next synchronization boundary. The functionality of synchronous communication mode 1102 identifies the next synchronization boundary for ending the established COT from synchronization boundaries 1103 using the timing from common clock 1101.

When the first node is implemented as UE 115, UE 115, within the execution environment of synchronous communication mode 1202, establishes a COT that will end at the next synchronization boundary. The functionality of synchronous communication mode 1202 identifies the next synchronization boundary for ending the established COT from synchronization boundaries 1203 using the timing from common clock 1201.

At block 404, the first node transmits data on the shared communication channel during the COT. When the first node is implemented as base station 105, base station 105 will transmit any downlink data stored in memory 242 at data 1105 via wireless radios 1100a-t and antennas 234a-t.

When the first node is implemented as UE 115, UE 115 will transmit any downlink data stored in memory 282 at data 1205 via wireless radios 1200a-r and antennas 252a-r.

It should be noted that the CCT LBT procedure may be used by synchronous nodes from same operator to check out COTs simultaneously without blocking each other. This facilitates CoMP operations and/or transmission according to a frequency reuse one. One example implementation of a CCT LBT procedure can be an extension of a Cat-2 LBT. A Cat-2 LBT procedure is typically a one-shot CCA over 16 μs or 25 μs. A CCT LBT procedure may perform multiple one-shot CCAs, under the Cat-2 LBT mechanics, over multiple random WiFi slots. WiFi slots may typically be 9 μs slots. Moreover, the node, such as node 301, can be configured with a probability mass function (PMF) to generate the random number of WiFi slots for performing the CCT LBT procedure. Alternatively, the node may be configured with a random number sequence over which to select the time index of WiFi slots.

It should further be noted that the CCT LBT procedure may include specified instants defined with respect to the common clock. In such aspects, the CCT LBT procedure may be configured with specific start or ending times according to the common clock.

Figure 5:
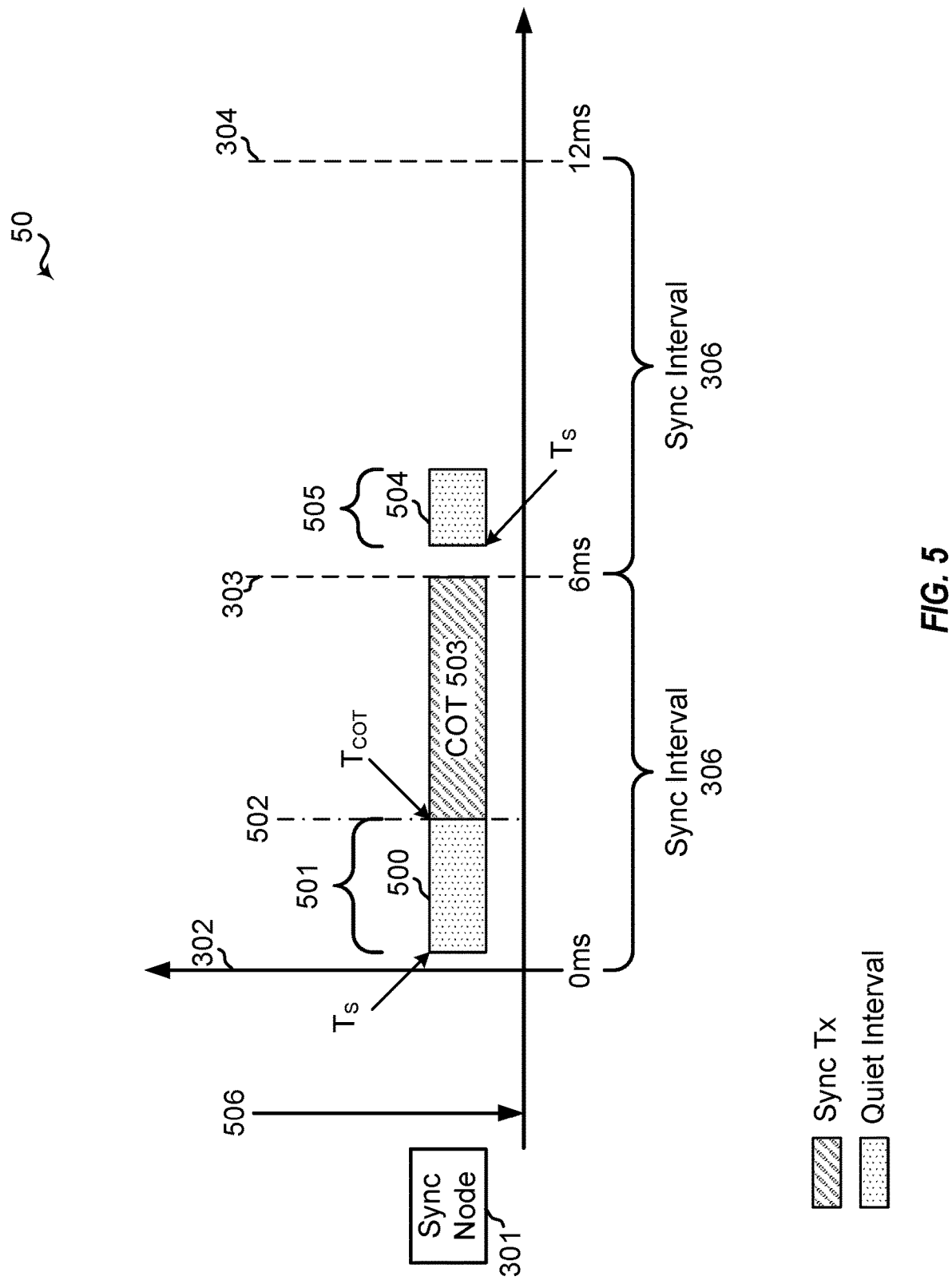
FIG. 5 is a block diagram illustrating a portion of a shared communication spectrum including a node using a synchronous communication mode to access shared communication spectrum according to some aspects of the disclosure.

FIG. 5 is a block diagram illustrating a portion of shared communication spectrum 50 including a node using a synchronous communication mode, node 301, to access shared communication spectrum 50. As referenced in FIG. 3, with access to the common clock, shared communication spectrum 50 and node 301 support the synchronous communications mode access. The synchronous communications mode uses synchronization boundaries 302-304 separating synchronization intervals 306. In shared communication spectrum 50, which may be implemented in the unlicensed/shared spectrum 6 GHz band, a node, such as node 301, can perform a CCT LBT procedure 501 during quiet interval 500, defined by a common clock, to secure access to a time-varying maximum channel occupancy time (MCOT), COT 503, that terminates at pre-defined instants, such as at the next synchronization boundary, synchronization boundary 303.

Node 301 may obtain CCT LBT configuration at 506, which may include multiple parameters for CCT LBT procedure 501, including LBT starting time ($T_S \geq 0$), COT start time ($T_{COT} \leq T_S$), and contention window (CW). $T_S$ and $T_{COT}$ may be defined as offsets with respect to the synchronization boundaries over the common-clock. The CCT LBT configuration may further include clear channel assessment (CCA) parameters, such as energy detection threshold (ED) for CCT LBT procedure 501. At quiet interval 504, after synchronization boundary 303, node 301 may again conduct CCT LBT procedure 505, which, as illustrated, fails without allowing node 301 access to shared communication spectrum 50 in synchronization interval 306, between synchronization boundaries 303 and 304.

Figure 6:
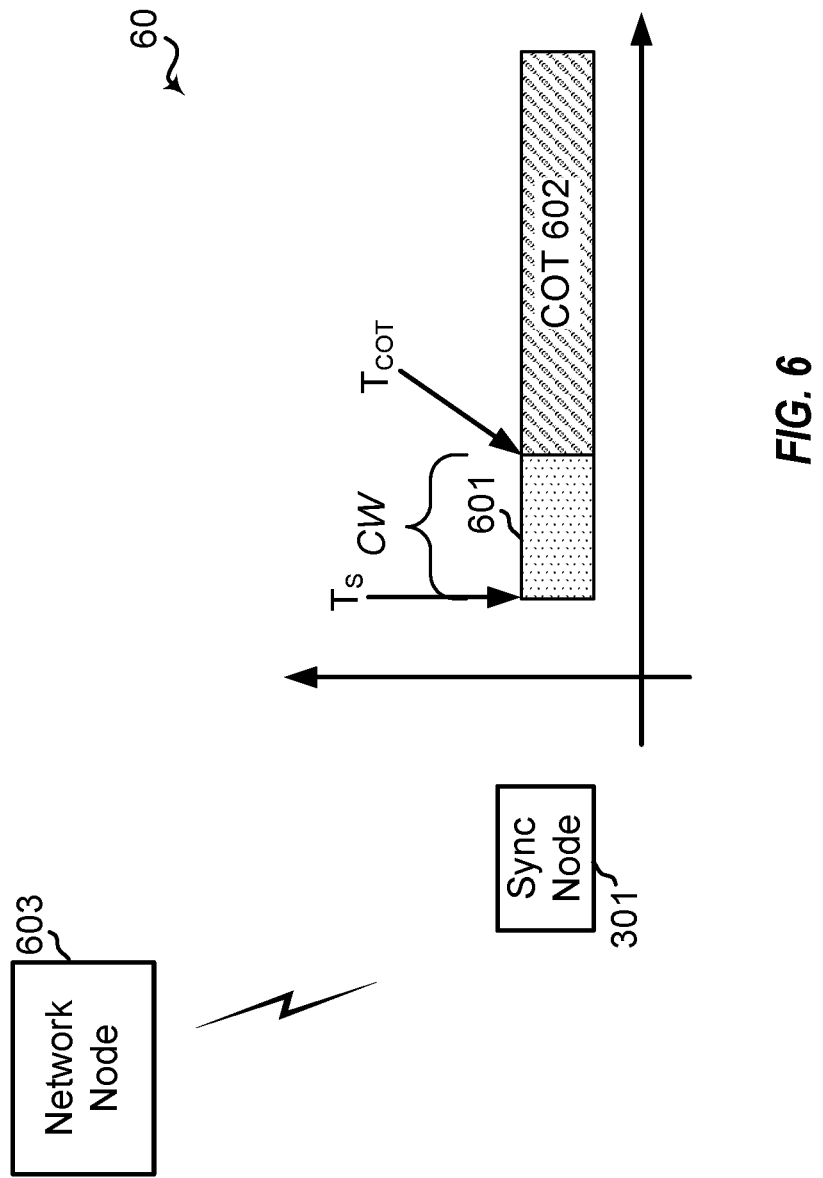
FIG. 6 is a block diagram illustrating an example of a node configured for synchronous communications mode access to a shared communication spectrum according to some aspects of the disclosure.

FIG. 6 is a block diagram illustrating node 301 configured according to aspects of the present disclosure for synchronous communications mode access to shared communication spectrum 60. For fair coexistence with known asynchronous channel access protocols, the starting time, $T_S$, can be configured to have a long-term-constant, $T_S \geq 0$, and a dynamic $T_{COT}$ according to a CW size. Specifically, node 301 can be configured to draw a random number from a specified distribution (e.g., uniform distribution, weighted distribution) for realization of the contention window size, CW, as $T_{COT}$-$T_S$. Node 301 may obtain such configuration parameters from a network node, such as network node 603. For example, when operating as a base station, node 301 can obtain this configuration information, together with the ED information from network node 603 configured as a geo-location database. Similarly, when operating as an integrate, access, and backhaul (IAB) node or a UE, node 301 can obtain these configurations from the remaining minimum system information (RMSI)/system information (SI) or from radio resource control (RRC) messaging or medium access control-control element (MAC-CE) signaling transmitted from network node 603 configured as a base station or transmission-reception point (TRP).

In an alternative aspect further illustrated in FIG. 6, node 301 can be configured with CCA parameters, such as ED threshold, and a dynamic COT starting time, $T_{COT}$. However, the starting time, $T_S$, ($T_{COT} \geq T_S \geq 0$) is not explicitly specified. In a first optional implementation of such aspect, node 301 may select $T_{COT}$ as a random number following a pre-determined distribution (e.g., uniform, weighted, etc.). In a second optional implementation of such aspect, node 301 may determine $T_{COT}$ from a pre-defined sequence of values, where the selected value is indexed based on the common-clock. Such use of a pre-defined sequence of values indexed by a common-clock may facilitate coordinated multipoint (CoMP) and/or a frequency reuse-one.

In another alternative aspect illustrated in FIG. 6, node 301 can be configured with CCA parameters, such as ED threshold, a long-term constant value of the relationship, $T_{COT}$-$T_S$ (e.g., 16 µs or 25 µs), and dynamic $T_S$. In a first optional implementation of such aspect, node 301 generates a random number following a pre-determined distribution to obtain the dynamic starting time, $T_S$. In a second optional implementation of such aspect, node 301 may determine $T_S$ from a pre-defined sequence using the common-clock to index the selected value. Again, such use of a pre-defined sequence of values indexed by the common clock may facilitate CoMP and/or frequency reuse-one.

Figure 7:
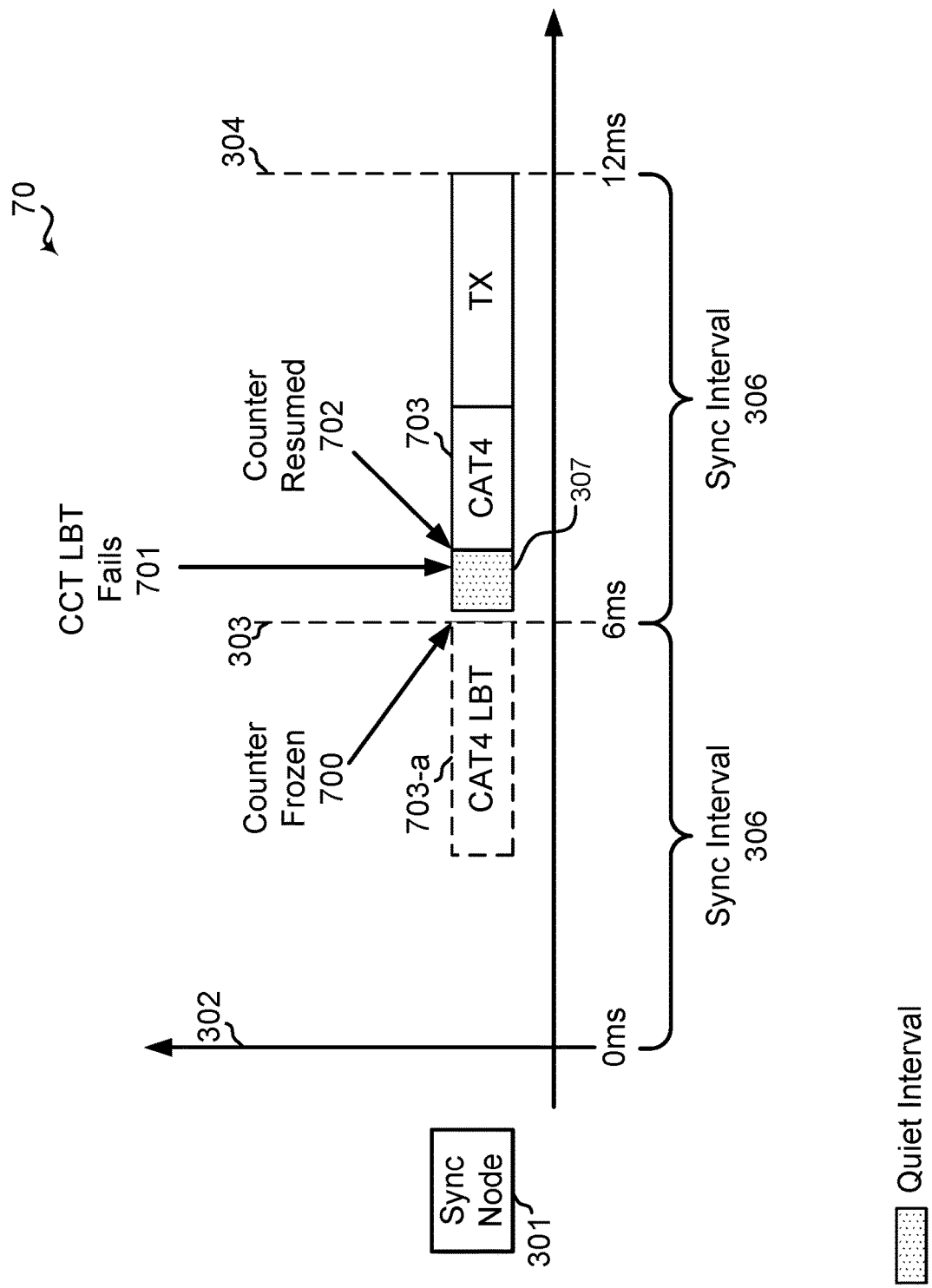
FIG. 7 is a block diagram illustrating a portion of a shared communication spectrum including a node configured for synchronous communications mode according to some aspects of the disclosure.

FIG. 7 is a block diagram illustrating a portion of shared communication spectrum 70 including node 301 configured for synchronous communications mode according to one aspect of the present disclosure. As noted above, with access to the common clock, shared communication spectrum 70 and node 301 support the synchronous communications mode access. The synchronous communications mode uses synchronization boundaries 302-304 defining synchronization intervals 306. If the CCT LBT procedure conducted by node 301 fails, node 301 may also perform a Cat-4 LBT procedure to secure a COT that will terminate at synchronization boundary 304. Therefore, while the CCT LBT procedure fails at 701, node 301 may attempt access to shared communication spectrum 70 via Cat-4 LBT 703. Upon detecting success of Cat-4 LBT 703, node 301 begins transmission, TX, until synchronization boundary 304.

In an additional example operation of the illustrated aspect, node 301 actually begins a Cat-4 LBT 703-a within synchronization interval 306 between synchronization boundaries 302 and 303. Node 301 continues to count down the Cat-4 LBT counter until synchronization boundary 303. Because node 301 is configured for the synchronous communications mode, when it reaches quiet interval 307, it has an opportunity for synchronous mode access via a CCT LBT procedure. Node 301 may, thus, suspend or freeze the Cat-4 LBT counter at 700 in order to perform the CCT LBT procedure during quiet interval 307. At 701, node 301 detects failure of the CCT LBT procedure. Outside of quiet interval 307, node 301 may resume its Cat-4 LBT 703 attempt by resuming the Cat-4 counter at 702. When node 301 detects success of Cat-4 LBT 703, the COT established with the successful Cat-4 LBT for transmission, TX, will end at synchronization boundary 304.

It should be noted that in alternative aspects of the present disclosure, node 301 can be configured to use different ED thresholds for the CCT LBT procedure at quiet interval 307 and the Cat-4 LBT 703-a and/or 703. When the CCT LBT procedure is configured to enable transmission under frequency reuse one, a lower ED threshold (e.g., −82 dBm) may provide a higher probability for success of the CCT LBT procedure. Cat-4 LBT 703-a and 703 can use a higher ED threshold (e.g., −72 dBm for nodes transmitting at 23 dBm over 20 MHz bandwidth).

Figure 8:
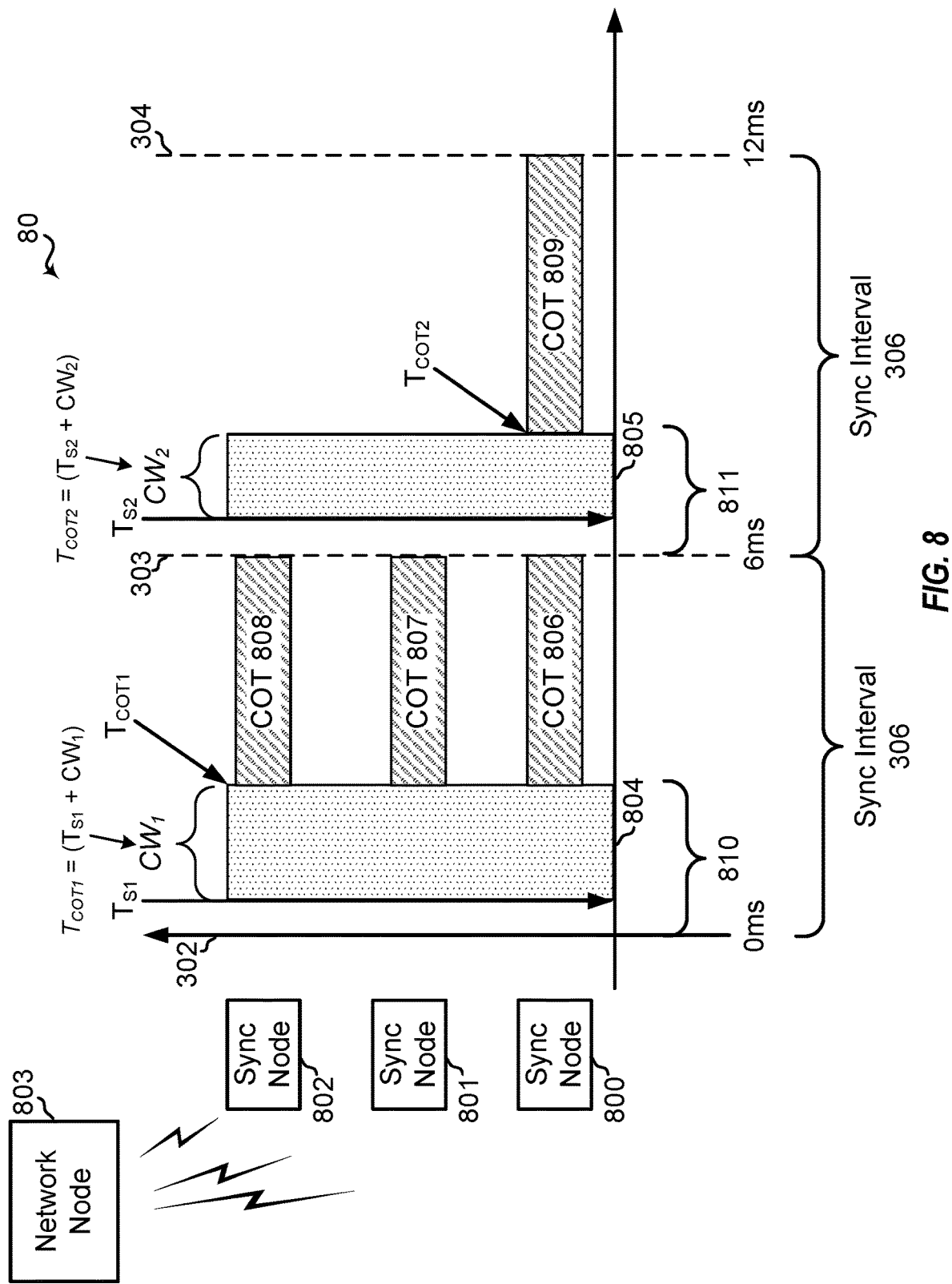
FIG. 8 is a block diagram illustrating a portion of a shared communication spectrum having nodes configured with the synchronous communications mode according to some aspects of the disclosure.

FIG. 8 is a block diagram illustrating a portion of shared communication spectrum 80 having nodes 800-802 configured with the synchronous communications mode according to aspects of the present disclosure. As noted previously, with access to the common clock, shared communication spectrum 80 and nodes 800-802 support the synchronous communications mode access. The synchronous communications mode uses synchronization boundaries 302-304 defining synchronization intervals 306. As noted above, nodes 800-802 can have various optional aspects for the CCT LBT configurations include the specific ED threshold (s). For example, the starting time, $T_S$, can be configured as a long-term-constant, $T_S \geq 0$, while a dynamic $T_{COT}$ is configured according to a contention window size. Alternatively, a dynamic COT starting time, $T_{COT}$, may be provisioned but the starting time, $T_S$, ($T_{COT} \geq T_S \geq 0$) is not explicitly specified. Further, the long-term constant value of the relationship, $T_{COT}$-$T_S$ (e.g., 16 µs or 25 µs), and a dynamic $T_S$ may also be specified in the CCT LBT configuration.

Nodes 800-802 may obtain this CCT LBT configuration from other network nodes, such as network node 803. When nodes 800-802 are implemented as base stations, network node 803 may include a geo-location database. When nodes 800-802 are implemented as an IAB node or UE, nodes 800-802 may receive the revised configurations from network node 803 as a base station via system information (e.g., RMSI/SI) or via higher layer/layer 2-3 signaling (e.g., RRC/MAC-CE signaling).

In an alternative aspect of the present disclosure illustrated in FIG. 8, nodes 800-802 can be configured to update the contention window size, CW, according to whether any collisions were observed within the COT (COTs 806-808)

secured by CCT LBT procedure 804. For example, during a first quiet interval, quiet interval 810, nodes 800-802 are configured with a first contention window size, $CW_1$. Nodes 800-802 determine the COT starting time, $T_{COT1}$, according to $T_{S1}+CW_1$. Upon detecting a collision within one or more of COTs 806-808, respectively, nodes 800-802 may increase the contention window size for the next quiet interval, quiet interval 811. Nodes 800-802 may then use the new contention window size, $CW_2$. Alternatively, where no collision is detected, $CW_2$ may be decreased by nodes 800-802. Nodes 800-802 may the determine $T_{COT2}$ according to $T_{S2}+CW_2$. Each of nodes 800-802 performs CCT LBT procedure 805. However, nodes 801 and 802 detect failure of CCT LBT procedure 805, while node 800 detects success of CCT LBT procedure 805. Therefore, node 800 secures COT 809 for transmissions until synchronization boundary 304.

In a further alternative aspect, as illustrated in FIG. 8, after identifying a collision through cyclic redundancy check (CRC) failure in any of COTs 806-808, a corresponding one of nodes 800-802 may perform a post-COT CCA over the next quiet interval, quiet interval 811, to determine whether the collision is with asynchronous or synchronous access mode node(s). Thus, for example, node 800 detects a collision within COT 806. In response, node 800 may perform a CCA during quiet interval 811 to determine whether the collision was with a synchronous or asynchronous mode node. The contention window offsets that node 800 would apply to $CW_1$ to obtain $CW_2$ would depend on whether the collision was with a synchronous mode node or an asynchronous mode node.

In a further example aspect illustrated in FIG. 8, in order to facilitate a COMP-like advanced MIMO technology, nodes 800-802, which may be from the same operator or in the same CoMP cluster can be configured to use the same sequence of random numbers for CCT LBT procedures 804 and 805 during quiet intervals 810 and 811. Thus, instead of configuring the contention window size, CW, and drawing the random number accordingly, nodes 800-802 may use a sequence of random numbers indexed by the common clock for a realization of $T_{COT}-T_S$. This selection may enable all of nodes 800-802, in the same CoMP cluster, to have the same random counter value at the same instant defined by the common clock. By using the same random counter value, there may be no intra-COMP cluster blocking between nodes 800-802.

Figure 9:
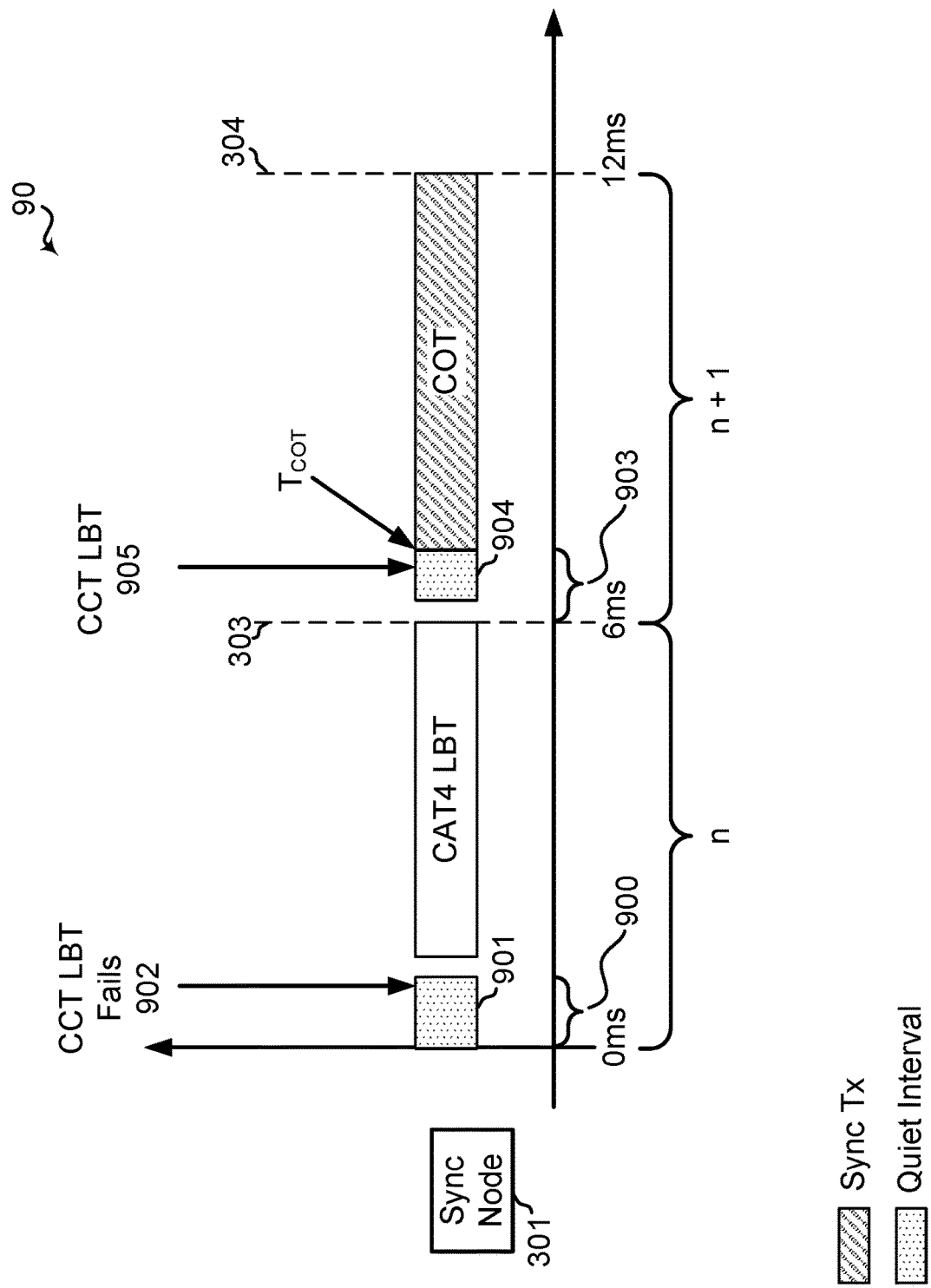
FIG. 9 is a block diagram illustrating a portion of a shared communication spectrum including a node configured for synchronous communications mode according to some aspects of the disclosure.

FIG. 9 is a block diagram illustrating a portion of shared communication spectrum 90 including node 301 configured for synchronous communications mode according to one aspect of the present disclosure. As noted above, with access to the common clock, shared communication spectrum 70 and node 301 support the synchronous communications mode access. The synchronous communications mode uses synchronization boundaries 302-304 defining synchronization intervals 306. Node 301 can use different sets of ED thresholds for different intervals defined over the common clock. For example, node 301 may use an ED threshold of −82 dBm for the n-th interval and −62 dBm for the ED threshold in the (n+1)-th interval. Where node 301 fails CCT LBT procedure 901 at 902 in quiet interval 900 in the n-th interval, node 301 may then be configured to use −82 dBm for the ED threshold for the following Cat-4 LBT procedure in n-th interval and −62 dBm for the ED threshold for any Cat-4 LBTs in the (n+1)-th interval. Otherwise, node 301 may use a −72 dBmn ED threshold for any Cat-4 LBTs. This variable ED threshold configuration may motivate co-existing WiFi nodes to be clustered to the n-th interval to exploit hidden node protection.

As illustrated, node 301 fails CCT LBT procedure 901 in the n-th interval using a first ED threshold, and when failure is detected at 902, node 301 performs CCT LBT procedure 904, during quiet time 903 of the (n+1)-th interval using the more favorable second ED threshold. At 905, node 301 detects success of CCT LBT procedure 904 and secures a COT beginning at $T_{COT}$ and ending at synchronization boundary 304.

Figure 10:
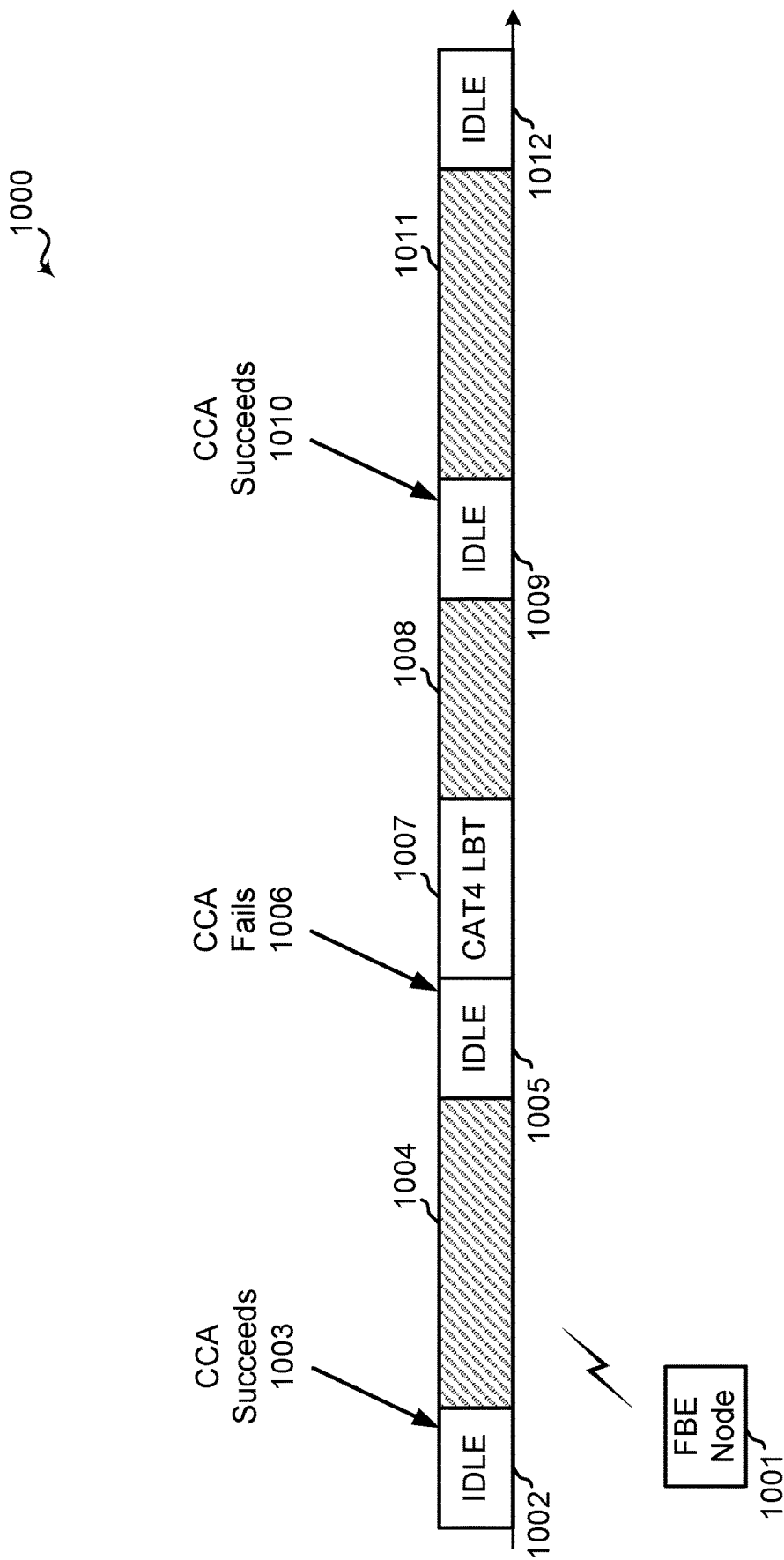
FIG. 10 is a block diagram illustrating a portion of a shared communication spectrum with a frame-based equipment (FBE) node configured for synchronous communications mode access according to some aspects of the disclosure.

FIG. 10 is a block diagram illustrating a portion of shared communication spectrum 1000 with frame-based equipment (FBE) node 1001 configured for synchronous communications mode access. The various aspects of the present disclosure as described previously with respect to load-based equipment (LBE), may also be applied for enhanced/external FBE channel access. FBE node 1001 conducts a CCA at idle period 1002, which succeeds at 1003. FBE node 1001, may then transmit on COT 1004 on shared communication spectrum 1000. During idle period 1005, FBE node 1001 may conduct an additional CCA, which is detected to fail at 1006. After failing the CCA, FBE node 1001 may then attempt asynchronous mode access through performing a Cat-4 LBT 1007. Any resulting COT 1008 from Cat-4 LBT 1007 will be time-varying and end by the next idle period 1009. After another successful CCA at 1010 in idle period 1009, FBE node 1001 may establish COT 1011 for transmissions to end at idle period 1012.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (such as in FIG. 4) may include processors, electronics devices, hardware devices, electronics components, logical circuits, memories, software codes, firmware codes, etc., or any combination thereof.

Those of skill would further appreciate that the various illustrative logical blocks, modules, circuits, and operations described herein may be implemented as electronic hardware, computer software, or combinations of both. To illustrate, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are examples and that the components, methods, or interactions may be combined or performed in ways other than those illustrated and described herein.

The various aspects of the present disclosure may be implemented in different ways, including methods, processes, a non-transitory computer-readable medium having program code recorded thereon, an apparatus having one or more processors with configurations and instructions for performing the described features and functionality, and the like. A first aspect of wireless communication includes identifying, by a first node configured for operation in a synchronous communication mode, a current synchronization boundary according to a common clock of the synchronous communication mode, performing, by the first node, a CCT LBT procedure of a shared communication channel during a periodic quiet interval at the current synchronization boundary, establishing, by the first node, in response to success of the CCT LBT procedure, a COT configured to end at a subsequent synchronization boundary and transmitting, by the first node, data on the shared communication channel during the COT.

A second aspect, based on the first aspect, further including obtaining, by the first node, an LBT configuration of the CCT LBT procedure, wherein the LBT configuration includes at least a starting time, $T_S$, of the CCT LBT procedure, a COT starting time, $T_{COT}$; and an ED threshold configuration.

A third aspect, based on the second aspect, wherein the starting time, $T_S$, and the COT starting time, $T_{COT}$, are each defined as an offset relative to the current synchronization boundary.

A fourth aspect, based on the second aspect, wherein the obtaining includes one of receiving the LBT configuration via a geo-location database, wherein the first node includes a base station, receiving the LBT configuration via layer 2 signaling, wherein the first node includes one of: a UE or an IAB node, or receiving the LBT configuration via layer 3 signaling, wherein the first node includes one of: a UE or an IAB node.

A fifth aspect, based on the second aspect, wherein the obtaining the LBT configuration includes receiving the ED threshold configuration, receiving the starting time, $T_S$, as a long term constant, and determining the COT starting time, $T_{COT}$, as a dynamic value determined according to a CW size, where the CW size=$T_{COT}$-$T_S$.

A sixth aspect, based on the fifth aspect, wherein the determining the COT starting time, $T_{COT}$, includes selecting a random contention window (CW) size from a specified distribution of CW sizes, where the COT starting time, $T_{COT}$, =$T_S$+the random CW size.

A seventh aspect, based on the sixth aspect, further including one of increasing, by the first node, the CW size by a first offset value for a next CCT LBT procedure at the subsequent synchronization boundary in response to detection of a signal collision during the transmission of the data on the shared communication channel during the COT, or decreasing, by the first node, the CW size by a second offset value for the next CCT LBT procedure at the subsequent synchronization boundary in response to detection of no signal collision during the transmission of the data on the shared communication channel during the COT.

An eighth aspect, based on the fifth aspect, further including detecting, by the first node, a signal collision during the transmission of the data on the shared communication channel during the COT, performing, by the first node, a CCA of the shared communication channel during a subsequent periodic quiet interval after the subsequent synchronization boundary, determining, by the first node, whether a colliding node of the signal collision is in one of: a synchronous communication mode or an asynchronous communication mode based on a result of the CCA, updating, by the first node, the CW size by a first offset value for a next CCT LBT procedure at the subsequent periodic quiet interval in response to the colliding node being in the synchronous communication mode, and updating, by the first node, the CW size by a second offset value for the next CCT LBT procedure at the subsequent periodic quiet interval in response to the colliding node being in the asynchronous communication mode.

A ninth aspect, based on the fifth aspect, wherein the determining the COT starting time, $T_{COT}$, includes identifying a selected CW size of a pre-configured sequence of CW sizes, wherein the selected CW size is selected from the pre-configured sequence of CW sizes according to the common clock, where the COT starting time, $T_{COT}$, =$T_S$+the selected CW size.

A tenth aspect, based on the ninth aspect, wherein the pre-configured sequence of CW sizes are shared by one or more other coordinated neighboring nodes, and wherein each of the first node and the one or more other coordinated neighboring nodes uses a same selected CW size of the pre-configured sequence of CW sizes for the performing the CCT LBT procedure.

An eleventh aspect, based on the tenth aspect, wherein the first node and the one or more other coordinated neighboring nodes is one of: served by a same network operator, or a member of a same CoMP cluster.

A twelfth aspect, based on the second aspect, wherein the obtaining the LBT configuration includes receiving the ED threshold configuration, and determining the COT starting time, $T_{COT}$, as a dynamic value determined according to a set of $T_{COT}$ values.

A thirteenth aspect, based on the twelfth aspect, wherein the set of $T_{COT}$ values is a specified distribution of $T_{COT}$ values and wherein the COT starting time, $T_{COT}$, is determined by random selection of the $T_{COT}$ from the specified distribution of $T_{COT}$ values.

A fourteenth aspect, based on the twelfth aspect, wherein the set of $T_{COT}$ values is a pre-configured sequence of $T_{COT}$ values and wherein the COT starting time, $T_{COT}$, is determined by selection of the $T_{COT}$ from the pre-configured sequence of $T_{COT}$ values indexed according to the common clock.

A fifteenth aspect, based on the second aspect, wherein the obtaining the LBT configuration includes receiving the ED threshold configuration, determining the starting time, $T_S$, as a dynamic value determined according to a set of $T_S$ values, and receiving a long term constant corresponding to a CW size, where the CW size=$T_{COT}$-$T_S$.

A sixteenth aspect, based on the fifteenth aspect, wherein the set of $T_S$ values is a specified distribution of $T_S$ values and wherein the starting time, $T_S$, is determined by random selection of the $T_S$ from the specified distribution of $T_S$ values.

A seventeenth aspect, based on the fifteenth aspect, wherein the set of $T_S$ values is a pre-configured sequence of $T_S$ values and wherein the starting time, $T_S$, is determined by selection of the $T_S$ from the pre-configured sequence of $T_S$ values indexed according to the common clock.

An eighteenth aspect, based on the second aspect, further including performing, by the first node, in response to failure of the CCT LBT procedure, an LBT procedure of the shared communication channel after an end of the CCT LBT procedure, establishing, by the first node, in response to success of the LBT procedure, a shortened COT ending at a COT ending time, $T_E$, and transmitting, by the first node, the data on the shared communication channel during the shortened COT.

A nineteenth aspect, based on the eighteenth aspect, further including attempting, by the first node, access to the shared communication channel prior to the current synchronization boundary using the LBT procedure, freezing, by the first node, an LBT counter of the LBT procedure at the COT starting time, $T_{COT}$, of the CCT LBT procedure, and resuming, by the first node, the LBT counter upon detection of the failure of the CCT LBT procedure, wherein the performing the LBT procedure includes continuing the LBT procedure with the resuming of the LBT counter.

A twentieth aspect, based on the nineteenth aspect, wherein the first node is further configured for FBE channel access to the shared communication channel and the periodic quiet interval corresponds to an idle period of the FBE channel access.

A twenty-first aspect, based on the nineteenth aspect, wherein a CCT LBT ED threshold value of the ED threshold configuration of the LBT configuration of the CCT LBT procedure is different than an LBT ED threshold value of the ED threshold configuration of the LBT configuration of the LBT procedure.

A twenty-second aspect, based on the twenty-first aspect, wherein the CCT ED threshold value provides one of a higher probability of successful access to the shared communication channel over the LBT ED threshold value, or a lower probability of successful access to the shared communication channel than the LBT ED threshold value.

A twenty-third aspect, based on the second aspect, wherein the ED threshold configuration of the LBT configuration defines a plurality of sets of ED threshold values with each set of the plurality of sets of ED threshold values applicable by the first node to a predetermined synchronization interval beginning at an associated synchronization boundary and with each ED threshold value of each set of the plurality of sets of ED threshold values applicable by the first node to an available LBT category, and wherein the performing the CCT LBT procedure, includes monitoring the shared communication channel for energy using a CCT LBT ED threshold value of a set of ED threshold values of the plurality of sets of ED threshold values associated with a first synchronization interval beginning at the current synchronization boundary.

A twenty-fourth aspect, based on the twenty-third aspect, further including, in response to failure of the CCT LBT procedure, performing, by the first node, an LBT procedure of the shared communication channel after the periodic quiet interval of the first synchronization interval using an LBT ED threshold value of the set of ED threshold values.

A twenty-fifth aspect including any combination of the first aspect through the twenty-fourth aspect.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
   identifying, by a first node configured for operation in a synchronous communication mode, a current synchronization boundary according to a common clock of the synchronous communication mode;
   performing, by the first node, a common clock-triggered (CCT) listen before talk (LBT) procedure of a shared communication channel during a periodic quiet interval at the current synchronization boundary;
   establishing, by the first node, in response to success of the CCT LBT procedure, a channel occupancy time (COT) configured to end at a subsequent synchronization boundary; and transmitting, by the first node, data on the shared communication channel during the COT.

2. The method of claim 1, further including:
obtaining, by the first node, an LBT configuration of the CCT LBT procedure, wherein the LBT configuration includes at least:
a starting time of the CCT LBT procedure;
a COT starting time; and
an energy detection (ED) threshold configuration.

3. An apparatus configured for wireless communication, comprising:
means for identifying, by a first node configured for operation in a synchronous communication mode, a current synchronization boundary according to a common clock of the synchronous communication mode;
means for performing, by the first node, a common clock-triggered (CCT) listen before talk (LBT) procedure of a shared communication channel during a periodic quiet interval at the current synchronization boundary;
means for establishing, by the first node, in response to success of the CCT LBT procedure, a channel occupancy time (COT) configured to end at a subsequent synchronization boundary; and
means for transmitting, by the first node, data on the shared communication channel during the COT.

4. The apparatus of claim 3, further including:
means for obtaining, by the first node, an LBT configuration of the CCT LBT procedure, wherein the LBT configuration includes at least:
a starting time of the CCT LBT procedure;
a COT starting time; and
an energy detection (ED) threshold configuration.

5. A non-transitory computer-readable medium having program code recorded thereon, the program code comprising:
program code executable by a computer for causing the computer to identify, by a first node configured for operation in a synchronous communication mode, a current synchronization boundary according to a common clock of the synchronous communication mode;
program code executable by the computer for causing the computer to perform, by the first node, a common clock-triggered (CCT) listen before talk (LBT) procedure of a shared communication channel during a periodic quiet interval at the current synchronization boundary;
program code executable by the computer for causing the computer to establish, by the first node, in response to success of the CCT LBT procedure, a channel occupancy time (COT) configured to end at a subsequent synchronization boundary; and
program code executable by the computer for causing the computer to transmit, by the first node, data on the shared communication channel during the COT.

6. The non-transitory computer-readable medium of claim 5, further including:
program code executable by the computer for causing the computer to obtain, by the first node, an LBT configuration of the CCT LBT procedure, wherein the LBT configuration includes at least:
a starting time of the CCT LBT procedure;
a COT starting time; and
an energy detection (ED) threshold configuration.

7. An apparatus configured for wireless communication, the apparatus comprising:
at least one processor; and
a memory coupled to the at least one processor,
wherein the at least one processor is configured to:
identify, by a first node configured for operation in a synchronous communication mode, a current synchronization boundary according to a common clock of the synchronous communication mode;
perform, by the first node, a common clock-triggered (CCT) listen before talk (LBT) procedure of a shared communication channel during a periodic quiet interval at the current synchronization boundary;
establish, by the first node, in response to success of the CCT LBT procedure, a channel occupancy time (COT) configured to end at a subsequent synchronization boundary; and
transmit, by the first node, data on the shared communication channel during the COT.

8. The apparatus of claim 7, wherein the at least one processor is further configured to obtain, by the first node, an LBT configuration of the CCT LBT procedure, wherein the LBT configuration includes at least:
a starting time of the CCT LBT procedure;
a COT starting time; and
an energy detection (ED) threshold configuration.

9. The apparatus of claim 8, wherein the starting time and the COT starting time are each defined as an offset relative to the current synchronization boundary.

10. The apparatus of claim 8, wherein the at least one processor is further configured to:
receive the LBT configuration via a geo-location database, wherein the first node includes a base station;
receive the LBT configuration via layer 2 signaling, wherein the first node includes one of: a user equipment (UE) or an integrate, access, and backhaul (IAB) node; or
receive the LBT configuration via layer 3 signaling, wherein the first node includes one of: a user equipment (UE) or an integrate, access, and backhaul (IAB) node.

11. The apparatus of claim 8, wherein the at least one processor is further configured to:
receive the ED threshold configuration;
receive the starting time as a long term constant; and
determine the COT starting time as a dynamic value determined according to a contention window (CW) size.

12. The apparatus of claim 11, wherein the at least one processor is further configured to select a random CW size from a specified distribution of CW sizes as the CW size.

13. The apparatus of claim 11, wherein the at least one processor is further configured to:
increase, by the first node, the CW size by a first offset value for a next CCT LBT procedure at the subsequent synchronization boundary in response to detection of a signal collision during the transmission of the data on the shared communication channel during the COT; or
decrease, by the first node, the CW size by a second offset value for the next CCT LBT procedure at the subsequent synchronization boundary in response to detection of no signal collision during the transmission of the data on the shared communication channel during the COT.

14. The apparatus of claim 11, wherein the at least one processor is further configured to:
detect, by the first node, a signal collision during the transmission of the data on the shared communication channel during the COT;

perform, by the first node, a clear channel assessment (CCA) of the shared communication channel during a subsequent periodic quiet interval after the subsequent synchronization boundary;

determine, by the first node, whether a colliding node of the signal collision is in one of: a synchronous communication mode or an asynchronous communication mode based on a result of the CCA;

update, by the first node, the CW size by a first offset value for a next CCT LBT procedure at the subsequent periodic quiet interval in response to the colliding node being in the synchronous communication mode; and update, by the first node, the CW size by a second offset value for the next CCT LBT procedure at the subsequent periodic quiet interval in response to the colliding node being in the asynchronous communication mode.

15. The apparatus of claim 11, wherein the at least one processor is further configured to identify a selected CW size of a pre-configured sequence of CW sizes, wherein the selected CW size is selected from the pre-configured sequence of CW sizes according to the common clock, and wherein the CW size corresponds to the selected CW size.

16. The apparatus of claim 15, wherein the pre-configured sequence of CW sizes are shared by one or more other coordinated neighboring nodes, and wherein each of the first node and the one or more other coordinated neighboring nodes uses a same selected CW size of the pre-configured sequence of CW sizes for the performing the CCT LBT procedure.

17. The apparatus of claim 16, wherein the first node and the one or more other coordinated neighboring nodes is one of: served by a same network operator, or a member of a same coordinated multi-point (CoMP) cluster.

18. The apparatus of claim 8, wherein the at least one processor is further configured:
to receive the ED threshold configuration; and
to determine the COT starting time as a dynamic value determined according to a set of values.

19. The apparatus of claim 18, wherein the set of values is a specified distribution of values, and wherein the COT starting time is determined by random selection from the specified distribution of values.

20. The apparatus of claim 18, wherein the set of values is a pre-configured sequence of values, and wherein the COT starting time is determined by selection from the pre-configured sequence of values indexed according to the common clock.

21. The apparatus of claim 8, wherein the at least one processor is further configured:
to receive the ED threshold configuration;
to determine the starting time as a dynamic value determined according to a set of values; and
to receive a long term constant corresponding to a contention window (CW) size.

22. The apparatus of claim 21, wherein the set of values is a specified distribution of values, and wherein the starting time is determined by random selection from the specified distribution of values.

23. The apparatus of claim 21, wherein the set of values is a pre-configured sequence of values, and wherein the starting time is determined by selection of the from the pre-configured sequence of values indexed according to the common clock.

24. The apparatus of claim 8, wherein the at least one processor is further configured to:

perform, by the first node, in response to failure of the CCT LBT procedure, an LBT procedure of the shared communication channel after an end of the CCT LBT procedure;

establish, by the first node, in response to success of the LBT procedure, a shortened COT ending at a COT ending time; and transmit, by the first node, the data on the shared communication channel during the shortened COT.

25. The apparatus of claim 24, wherein the at least one processor is further configured to:

attempt, by the first node, access to the shared communication channel prior to the current synchronization boundary using the LBT procedure;

freeze, by the first node, an LBT counter of the LBT procedure at the COT starting time of the CCT LBT procedure; and resume, by the first node, the LBT counter upon detection of the failure of the CCT LBT procedure.

26. The apparatus of claim 25, wherein the first node is further configured for frame based equipment (FBE) channel access to the shared communication channel and the periodic quiet interval corresponds to an idle period of the FBE channel access.

27. The apparatus of claim 25, wherein a CCT LBT ED threshold value of the ED threshold configuration is different than an LBT ED threshold value of the ED threshold configuration.

28. The apparatus of claim 27, wherein the CCT ED threshold value provides one of:

a higher probability of successful access to the shared communication channel over the LBT ED threshold value; or a lower probability of successful access to the shared communication channel than the LBT ED threshold value.

29. The apparatus of claim 8, wherein the ED threshold configuration of the LBT configuration defines a plurality of sets of ED threshold values with each set of the plurality of sets of ED threshold values applicable by the first node to a predetermined synchronization interval beginning at an associated synchronization boundary and with each ED threshold value of each set of the plurality of sets of ED threshold values applicable by the first node to an available LBT category, and wherein the at least one processor is further configured to monitor the shared communication channel for energy using a CCT LBT ED threshold value of a set of ED threshold values of the plurality of sets of ED threshold values associated with a first synchronization interval beginning at the current synchronization boundary.

30. The apparatus of claim 29, wherein the at least one processor is further configured, in response to failure of the CCT LBT procedure, to perform, by the first node, an LBT procedure of the shared communication channel after the periodic quiet interval of the first synchronization interval using an LBT ED threshold value of the set of ED threshold values.

* * * * *